UNITED STATES PATENT OFFICE.

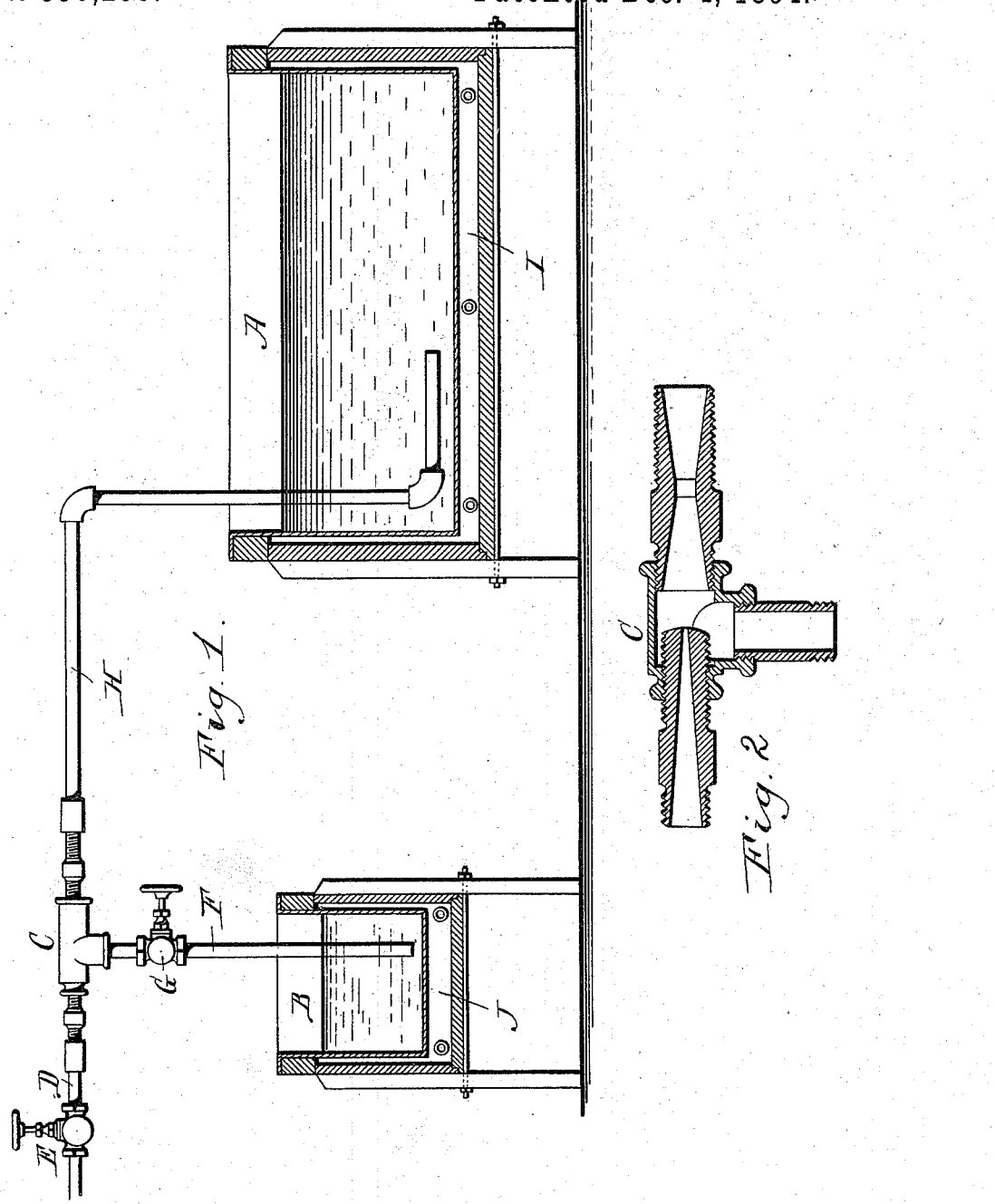

DAVID H. BURRELL, OF LITTLE FALLS, NEW YORK.

METHOD OF MAKING EMULSIONS IN CHEESE MANUFACTURE.

SPECIFICATION forming part of Letters Patent No. 530,298, dated December 4, 1894.

Application filed March 5, 1894. Serial No. 502,380. (No specimens.)

*To all whom it may concern:*

Be it known that I, DAVID H. BURRELL, a citizen of the United States, residing at Little Falls, in the county of Herkimer and State of New York, have invented a new and useful Improvement in Methods of Making Emulsions for the Manufacture of Cheese, of which the following is a specification.

This invention relates to the manufacture of an emulsion suitable for the manufacture of cheese and composed of milk, skim milk, butter milk or whey, and a suitable oleaginous material, such for instance, as butter, lard, or some other suitable oil or fat.
In manufacturing artificially enriched cheese an emulsion is made in which the oleaginous material is so finely divided and intimately blended with the milk or its derivatives, that during the process of adding the rennet and coagulating the milk, the oleaginous material becomes incorporated with the curd and is so retained until the cheese is completed.

The object of my invention is to produce an emulsion which is of fine quality and contains a large percentage of oleaginous material, and to produce such emulsion in a simple and expeditious manner.

In practicing my invention for the purpose of manufacturing artificially enriched cheese from skim milk, the latter is placed in a cheese vat, or other suitable receptacle, with which an atomizer is connected, through which the oleaginous material is delivered in the form of a very fine spray into the body of skim milk. Any suitable atomizer, for instance a steam injector or ejector, through which the oleaginous material is passed and in which the same is broken up and finely atomized by the steam jet may be used for the purpose. The skim milk is preferably heated to about 88° Fahrenheit and the oleaginous material, if lard is used, to about 125° Fahrenheit.
The oleaginous material in passing through the atomizer is finely divided by the current of steam, air or other fluid under pressure, and this atomized oleaginous material is then directly injected into the body of skim milk, without being first converted into an emulsion with milk or its derivatives as is usually the case.

From two to two and one-half pounds of oleaginous material to one hundred pounds of skim milk is a suitable proportion for making cheese but this percentage of oleaginous material may be increased by my improved process without danger of the oleaginous material separating from the lactic fluid.

By atomizing the oleaginous material and then injecting it directly into the body of skim milk a larger proportion of oleaginous material can be incorporated with the skim milk and retained in the curd than by converting the oleaginous material first into an emulsion with milk or its derivatives and then injecting such emulsion into the skim milk.

The atomizer is best operated by a steam jet by which the atomized oleaginous material is also forcibly delivered into the body of the skim milk and distributed throughout the same, so as to form with the skim milk an emulsion in which the minute particles of oleaginous material are uniformly distributed in such a finely divided state that the oleaginous material does not separate from the skim milk during the process of adding the rennet and coagulating the milk.

The steam injector may also be provided with an inlet through which air is drawn into the mixing chamber, as it is done in the well known hydro-carbon burners, in which case the air would assist in atomizing the liquid oleaginous material while passing through the injector and in diffusing it through the body of skim milk and forming an emulsion therewith. I do not wish, however, to limit myself to atomizers of any particular construction as any atomizer in which the liquid oleaginous material is broken up into exceedingly small atoms or particles by the jet of fluid under pressure, and commingled with such fluid in passing through the atomizer will answer the purpose.

In the accompanying drawings which represent an apparatus suitable for practicing my improved method, Figure 1 represents a sectional elevation of the apparatus and Fig. 2 a vertical section of the atomizer, on an enlarged scale.

Like letters of reference refer to like parts in the different figures.

A represents the cheese vat or other receptacle containing the skim milk; B, the receptacle for the liquid oleaginous material; C, the atomizer; D, the pipe by which the steam or other fluid under pressure is delivered to the atomizer and which is provided with a stop cock or valve E; F, the pipe by which the oleaginous material passes from the receptacle B to the atomizer and which is provided with a stop cock or valve G, and H the pipe by which the atomized oleaginous material passes from the atomizer to the cheese vat and is delivered near the bottom thereof.

The receptacle B may be arranged below the atomizer, as shown, so that the latter raises the oleaginous material by suction, or it may be arranged above the atomizer so that the liquid flows to the atomizer by gravity.

The cheese vat is surrounded by a steam space I and the oil receptacle by a steam space J for warming the contents to the proper temperature. The atomized oleaginous material is injected in a fine spray from the pipe H directly into the body of skim milk in the cheese vat and agitates the same and diffuses itself through the same, thereby converting it into an emulsion.

I claim as my invention—

The herein described method of producing an emulsion from skim milk or other lactic fluid and a suitable oleaginous material which consists in atomizing the oleaginous material by a jet of fluid under pressure and injecting such atomized material into the body of lactic fluid directly or without first converting it into an emulsion with lactic fluid, substantially as set forth.

Witness my hand this 1st day of March, 1894.

DAVID H. BURRELL.

Witnesses:
W. C. FITCH,
G. PRICHARD.